United States Patent [19]

Manes

[11] 3,917,821

[45] Nov. 4, 1975

[54] PALATABLE ACTIVATED CARBON

[76] Inventor: Milton Manes, 1613 Chadwick Drive, Kent, Ohio 44240

[22] Filed: Oct. 23, 1973

[21] Appl. No.: 409,002

[52] U.S. Cl. ............................................. 424/125
[51] Int. Cl.$^2$ ........................................ A61K 33/44
[58] Field of Search .................................. 424/125

[56] References Cited
UNITED STATES PATENTS

| | | | |
|---|---|---|---|
| 1,589,081 | 6/1923 | Adler | 424/125 |
| 2,143,088 | 1/1939 | Rockwell | 424/125 |
| 2,508,602 | 5/1950 | Goetz | 424/125 |
| 2,787,579 | 4/1957 | VanderWeel | 424/125 |
| 2,934,472 | 4/1960 | May | 424/125 |
| 3,642,986 | 2/1972 | Welch | 424/125 |

FOREIGN PATENTS OR APPLICATIONS

| | | | |
|---|---|---|---|
| 51,388 | 7/1966 | Poland | 424/125 |

OTHER PUBLICATIONS

Remington's Pharmaceutical Sciences (1965), p. 564.

*Primary Examiner*—Norman A. Drezin
*Attorney, Agent, or Firm*—Cushman, Darby & Cushman

[57] ABSTRACT

Activated carbon is made more palatable by mixing it with non-toxic thickening agents and water. The carbon must be of small particle size. The thickening agents also lubricate the carbon.

13 Claims, No Drawings

PALATABLE ACTIVATED CARBON

BACKGROUND OF THE INVENTION

It is well recognized that activated carbon (activated charcoal) is a powerful antidote for many poisons) thus see Anderson, Acta Pharmacologica Vol. 2, pages 69–78 (1946); Holt, The Journal of Pediatrics, Vol. 63, pages 306–314 (1963) and Picchioni, Pediatric Clinics of North America, Vol. 17, pages 535–543 (1970). Picchioni summarized the wide spectrum of toxic compounds investigated. These compounds range from aspirin to strychnine; for each compound Picchioni gives a suggested dose ratio. In general the mimimum dose suggested is a 5:1 weight ratio of carbon to poison when administered on an empty stomach and a 10:1 ratio on a full stomach. When administered in large enough quantities, then, activated carbon is clearly a valuable clinical tool as an emergency treatment for a wide range of ingested toxic materials; it is listed as an emergency antidote in the most recent U.S. Pharmacopoeia.

Activated carbon, although known to be effective as an antidote for a wide variety of poisons, is nevertheless not widely used in emergency treatment. This underutilization is primarily due to the difficulties encountered in administration. Powdered activated carbon is normally administered in the form of a freshly prepared water slurry either orally or by gastric lavage. Levy, *Clinical Pharmacology and Therapeutics*, Vol. 13, pages 317–322 (1972).

When administered orally this slurry is a very unpleasant black, tasteless, and odorless sludge that adheres to the buccal and pharyngeal tissues, causing a dry gritty feeling, gagging, and frequently regurgitation. The regurgitated carbon lessens its popularity further by creating a mess for the emergency room staff, staining uniforms and linen. Wide acceptance of activated carbon as a standard emergency treatment for acute poisonins would be enhanced if its palatability could be improved without reducing its effectiveness. The entire disclosure of Picchioni is incorporated by reference. As indicated it is well recognized that activated carbon is difficult to swallow, especially for children, e.g., see Arena, *J. American Medical Association*, Vol. 212, pages 327–328 (1970). As a result research has been undertaken to improve its palatability.

It is administered as a dilute water suspension the carbon content is rather low while as indicated it is very difficult to swallow in a fairly thick suspension and children, as well as adults, gag on it. A major problem to adding anything, particularly organic compounds, to the carbon is the concern that any organic addition would itself be absorbed on the carbon surface and thereby reduce significantly the effectiveness of the activated carbon as an antidote. Although the lubricating action of such substances as carboxymethylcellulose has been recognized (van der Weel U.S. Pat. No. 2,787,579) those who are skilled in the art have hesitated to incorporate such lubricants and/or thickeners in the activated carbon because of the supposition (found by applicant to be erroneous) that these lubricants or thickeners would themselves be adsorbed onto the activated carbon and therefore spoil its antidote activity. Thus, for example, van der Weel coated activated charcoal tablets with a thin film of carboxymethylcellulose so that they would be more easily swallowed but made specific provision to coat only a small part of the carbon because of the expectation that attempts to make more readily ingestable liquid slurries would be unsuccessful.

In contrast, applicant has found unexpectedly that such lubricants and/or thickeners as carboxymethylcellulose, sodium carboxymethyl cellulose, carragheenan, and sodium alginate, as well as bentonite clay, not only make activated carbon much more easily swallowed as an aqueous slurry (eliminating the tendency of the carbon to stick to the throat), but do not significantly interfere with the adsorption of the activated carbon for soluble compounds, e.g., toxic compounds which are water soluble. The discovered ability to prepare concentrated carbon slurries either as thick pastes that are readily eaten from a spoon or as thinner slurries that are readily swallowed as liquids represents a considerable improvement over the existing art, since it results in a product that can be swallowed in the necessary doses, especially by children, who have difficulty in swallowing large numbers of whole tablets. Of course, the slurries or pastes can also be administered orally to adults as well.

The preferred organic thickeners are of the polysaccharide type, such as sodium carboxymethylcellulose, carboxymethyl cellulose, alginic acid, sodium alginate, potassium alginate, ammonium alginate and carragheenan. Other thickeners which may be employed include dextrans, xanthans, guar gum and other carbohydrate gums and the like. Sodium carboxymethyl cellulose, sodium alginate and carragheenan are the presently preferred organic lubricants or thickeners with sodium carboxymethyl cellulose being especially preferred. Inorganic thickeners include the clay minerals, of which bentonite is the representative mineral that has been examined, in view of its acceptability for internal consumption.

Of the thickening agents examined for increasing palatability, bentonite was the best, because it has somewhat better lubricating properties than the polysaccharides. The relatively minor disadvantage, in the use of bentonite or other thixotropic clay is the fact that for best results 20% of the dry carbon-bentonite mixture, or about 5% of the thick liquid, is bentonite, whereas when the organic thickeners are employed they are present in the thickened slurries in negligible quantities. The use of alginic acid also has one disadvantage that should be noted: when the acid solvent was added to the alginate thickened activated carbon it gelled, holding the activated carbon in its gel structure. This gel did not interfere with the carbon's capacity, and is not too serious for *in vivo* use because the normal mechanical action of the stomach will quickly break up the gel.

Gelatin has been tried as a thickener, but does not work well for concentrated slurries; its use for thinner slurries is not excluded, but it is decidedly a less favored material. Cornstarch and similar starch thickeners are less favorable thickeners. Typical concentrations in which thickeners may be used (in water solution) are (in weight percent); sodium alginate, 0.5; sodium carboxymethyl cellulose, 2.0; and carragheenan, 2.0. Typical proportions of bentonite to pulverized activated charcoal (activated carbon) are 1:4 bentonite: carbon by weight. To make a thick slurry of catsup-like consistency, the ratios of carbon to thickener solution are typically 1 gram to 3 ml of solution for coal-based charcoals e.g., Pittsburgh activated carbon Types RB and PWA and 1 gram to 6 ml for carbons based on paper byproducts, such as Nuchar Carbon C-1000-N.

These ratios represent the upper limit for the activated carbon content of the slurries. If desired, the ratio of charcoal:liquid may be reduced to any desired extent, e.g., 1 gram to 100 ml or even lower. The slurries of high carbon concentration are designed to be eaten with a spoon, whereas the slurries of lower activated carbon concentrations may be drunk as smooth liquids, depending on the preferences of the patient. To make a slurry of the carbon-bentonite mixtures, it is necessary to add, typically, a minimum of 5 ml of water per gram of carbon-bentonite mixture. The improvement in palatability with all of these additives is striking.

The Pittsburgh activated carbons are preferred to the Nuchar, since while all of the activated carbons were similar in terms of adsorption characteristics, the finely ground Pittsburgh carbon (over 99%, through 325 mesh, Tyler Screen), by reducing grittiness showed better palatability then the standard grind Nuchar. Moreover, they were also nearly twice as dense as the Nuchar. This increased density of these coal type carbons lessens significantly the volume of antidote a patient must swallow if the more dense carbon is employed. Thus the apparent density of Pittsburgh carbon RB is about 0.5 and of Pittsburgh PWA is about 0.5. The density of Nuchar C-1000-N is about half of that.

Preferably the finely divided, e.g., pulverized, activated carbon has a particle size of 20 to 150 microns.

With organic thickening agents the thickeners is generally used in an amount of 0.3 to 5% by weight of solid thickener in the aqueous solution and the weight of carbon to thickener solution is generally 1 gram of carbon to from 2.5 to 20 ml (or approximately 2.5 to 20 grams) of thickener solution.

When using bentonite and other nontoxic thixotropic clays the clay to carbon weight ratio is between 1 to 5 and 1 to 1. The amount of water is at least 5 times the weight of clay and carbon. There is no advantage in having over 20 times as much water as clay carbon mixtures by weight.

In commercially manufactured preparations the carbon can be stored dry if desired, and the thickener solution stored in a separate container, and the two can be mixed immediately before use to the desired concentration of carbon. Alternatively, the mixed slurry (preferably sterile to inhibit any mold and other microorganism growth) can be packed in a can, plastic film or jar for immediate administration. A third possibility is to provide additional diluent for the thick slurry. It is well known from experience with activated carbon columns in water purification that contact with sterile water does not adversely affect the adsorptive powers of activated carbons.

The absence of any adverse effects by the thickeners has been demonstrated by comparative experiments on the amounts and rates of adsorption of aspirin from thickened solutions. It should be noted that the considerable increases in the dosage of activated carbon by the addition of thickeners outweigh any possible small reduction of adsorptive capacity. That no significant effect has been observed for adsorption from solution is directly contrary to the teaching of Rockwell U.S. Pat. No. 2,143,088 to the effect that the use of thickening agents such as gum acacia reduces the adsorptive powers of activated charcoal, and also to the teaching of the van deer Weel patent, Col. 1, line 57, that "it is undesirable to add considerable amounts of colloidal substances to the activated carbon."

I have found that the palatability of the charcoal slurry is improved to the point where it is readily swallowed by reducing the particle size to between 20 and 150 microns, preferably to between 100 and 30 microns. Further reduction in particle size is not harmful, but is not necessary. The present invention makes charcoal more palatable at any particle size in the pulverized range.

In order to increase further the palatability of the charcoal slurry, especially to children it is frequently useful to pack, along with the carbon preparation, some flavoring material such as chocolate or licorice powder, or a concentrated fruit-flavored extract, to be added as drop or two or for solids as a light sprinkle to the carbon slurry, without mixing, immediately prior to use, so that the patient will get a favorable impression from taste or ordor. As long as the organic content of the flavor is small compared with the weight of the carbon (for example less than 1%), the efficacy of the carbon will not be significantly reduced. On the other hand, flavoring materials cannot be incorporated beforehand in the carbon slurry without being adsorbed.

The activated carbon-aqueous thickening agent slurry of the present invention can be administered orally as an antidote against any toxic substance for which activated carbon has previously been employed, for example as an antidote against any of the toxic materials set forth in Picchioni.

Thus the activated carbon-aqueous thickening agent compositions of the present invention can be used as antidotes for aspirin, strychnine, barbital, chloroquine, chlorpheniramine, chlorpromazine, ethchlorovynol, glutethimide, kerosene, mefenamic acid, pentobarbital, propoxyphene, secobarbital and sodium salicylate.

EXAMPLE 1

Equilibrium adsorption of aspirin on activated charcoal in the presence and absence of added carboxymethylcellulose A 1.00 gram sample of Pittsburgh Grade RB activated charcoal (95%-50 microns) was shaken with 100 ml of 0.1 molar aqueous hydrochloric acid (to simulate gastric juice), the 100 ml of acid containing 0.250 grams of aspirin. After shaking for 16 hours at 25°C the carbon was filtered off the equilibrium solution found to contain 5.7 mg of aspirin (or 57 p.p.m. at a carbon loading of 0.24 grams aspirin/gram C). When a similar sample was shaken with 175 mg of aspirin, the equilibrium solution contained 1.0 mg aspirin (or 10 p.p.m. at a carbon loading of 0.17 grams aspirin per gram carbon).

The preceding experiments were repeated, except that this time the activated carbon samples were mixed with 3 ml each of 2% sodium carboxymethylcellulose. The results were not significantly different: 57 p.p.m. at a carbon loading of 0.24 grams aspirin per gram of carbon, and 10 p.p.m. at an aspirin loading of 0.18 grams aspirin/gram carbon.

EXAMPLE 2

Effect (or absence thereof) of thickeners on the rate of adsorption of aspirin on activated carbon Although the absence of any effect on equilibrium adsorption is significant, a more severe test is to see whether or not there is any effect on the rate of adsorption. Comparative tests were carried out as follows. In all cases 1 gram of Pittsburgh RB activated charcoal was shaken with a total volume of 100 ml of 0.1 molar aqueous hydrochloric acid at 25°C containing 250 mg of aspirin. Sodium carboxymethylcellulose was mixed with some samples in the ratio of 3 ml of 2% solution before diluting with the dilute acid. With other samples, 250 mg bentonite was mixed with the carbon by grinding in a mortar and a thick paste was made by triturating with 6 ml of water, again before dilution. All samples were shaken for a measured time of either 5 minutes of 15 minutes, followed by immediate filtration of enough solution for analysis, the filtration taking another two minutes. The results were as follows:

| Thickener | Final Aspirin Concentration (mg/100 ml) | |
|---|---|---|
| | 5 min (+2) | 15 min (+2) |
| none (control) | 6.0 | 6.0 |
| sodium carboxymethylcellulose | 5.7 | 6.0 |
| bentonite | 3.3 | 3.1 |
| | 7 | |

The data show that 97–98% of the aspirin was adsorbed in all cases within five minutes. The final concentrations, which are close to the equilibrium concentrations for a carbon loading of 25 wt. %, show that the system reaches equilibrium quite rapidly and that the speed of response is not hindered by the carboxymethylcellulose thickener. The somewhat lower equilibrium concentrations with bentonite indicate a slight auxiliary adsorptive action by the bentonites, which, however, is not considered to be significant for medical purposes.

The term water soluble polysaccharide thickening agent is intended to include materials such as carboxymethyl cellulose and its sodium and potassium salts, water soluble cellulose ethers, e.g., hydroxyethyl cellulose, methylcellulose, sodium, potassium and ammonium alginate, carragheenan, xanthan, dextran and guar gum.

The thickening agents as indicated can act as a lubricant for the carbon. Unless otherwise indicated all parts and percentages are by weight.

What is claimed is:

1. In a process for orally administering to a patient who has ingested a toxic substance susceptible to adsorption by activated carbon an aqueous slurry of activated carbon with the carbon being in an amount sufficient to adsorb the toxic substance, the improvement comprising improving the palatability of the carbon without significantly reducing the adsorptive power of the activated carbon by administering to said patient pulverized activated carbon of a particle size of up to 150 microns in water containing a non-toxic water soluble polysaccharide thickening agent selected from the group consisting of sodium carboxymethyl cellulose, carboxymethyl cellulose, alginic acid, sodium alginate, potassium alginate, ammonium alginate, carragheenan, dextran, xanthan and guar gum, said thickening agent being present in aqueous solution in an amount of 0.3 to 5% and the ratio of carbon to thickener solution is 1 gram of carbon to from 2.5 to 20 ml of thickener solution.

2. The process of claim 1 wherein the thickening agent is selected from the group consisting of sodium carboxymethyl cellulose, sodium alginate and carragheenan.

3. The process of claim 2 wherein the polysaccharide thickener is sodium carboxymethyl cellulose and the thickener content of the aqueous solution is between 1 and 5% and the ratio of carbon to thickener solution is between 1 gram of carbon to 3 ml of thickener solution and 1 gram of carbon to 20 ml of thickener solution.

4. The process of claim 2 wherein the polysaccharide thickener is sodium alginate and the thickener content of the aqueous solution is between 0.3 and 4% and the ratio of carbon to thickener solution is between 1 gram of carbon to 2.5 ml of thickener solution and 1 gram of carbon to 20 ml thickener solution.

5. The process of claim 2 wherein the polysaccharide thickener is carragheenan and the thickener content of the aqueous solution is between 1 and 5% and the ratio of carbon to thickener solution is between 1 gram of carbon to 3 ml of thickener solution and 1 gram of carbon to 20 ml of thickener solution.

6. The process of claim 1 wherein the composition consists essentially of the thickening agent, water and activated carbon, the activated carbon having a particle size of 20 to 150 microns.

7. The process of claim 6 wherein the activated carbon has a particle size of 30 to 100 microns.

8. The process of claim 1 wherein the activated carbon has a density of about 0.5.

9. In a process for orally administering to a patient who has ingested a toxic substance susceptible to adsorption by activated carbon an aqueous slurry of activated carbon with the carbon being in an amount sufficient to adsorb the toxic substance, the improvement comprising improving the palatability of the carbon without significantly reducing the adsorptive power of the activated carbon by administering to said patient pulverized activated carbon of a particle size of up to 150 microns in water containing a non-toxic clay thickener, the thickener being present in a weight ratio of thickener to carbon of between 1:5 and 1:1 and there is present at least 5 parts of water per part of clay and carbon by weight.

10. The process of claim 9 wherein the clay is bentonite.

11. The process of claim 10 wherein the composition consists essentially of the thickener, water and activated carbon, the activated carbon having a particle size of 20 to 150 microns.

12. The process of claim 11 wherein the activated carbon has a particle size of 30 to 100 microns.

13. The process of claim 12 wherein the activated carbon has a density of about 0.5.

* * * * *